Dec. 21, 1937.  M. F. NELSON  2,103,222
FISHING FLOAT
Filed April 14, 1936
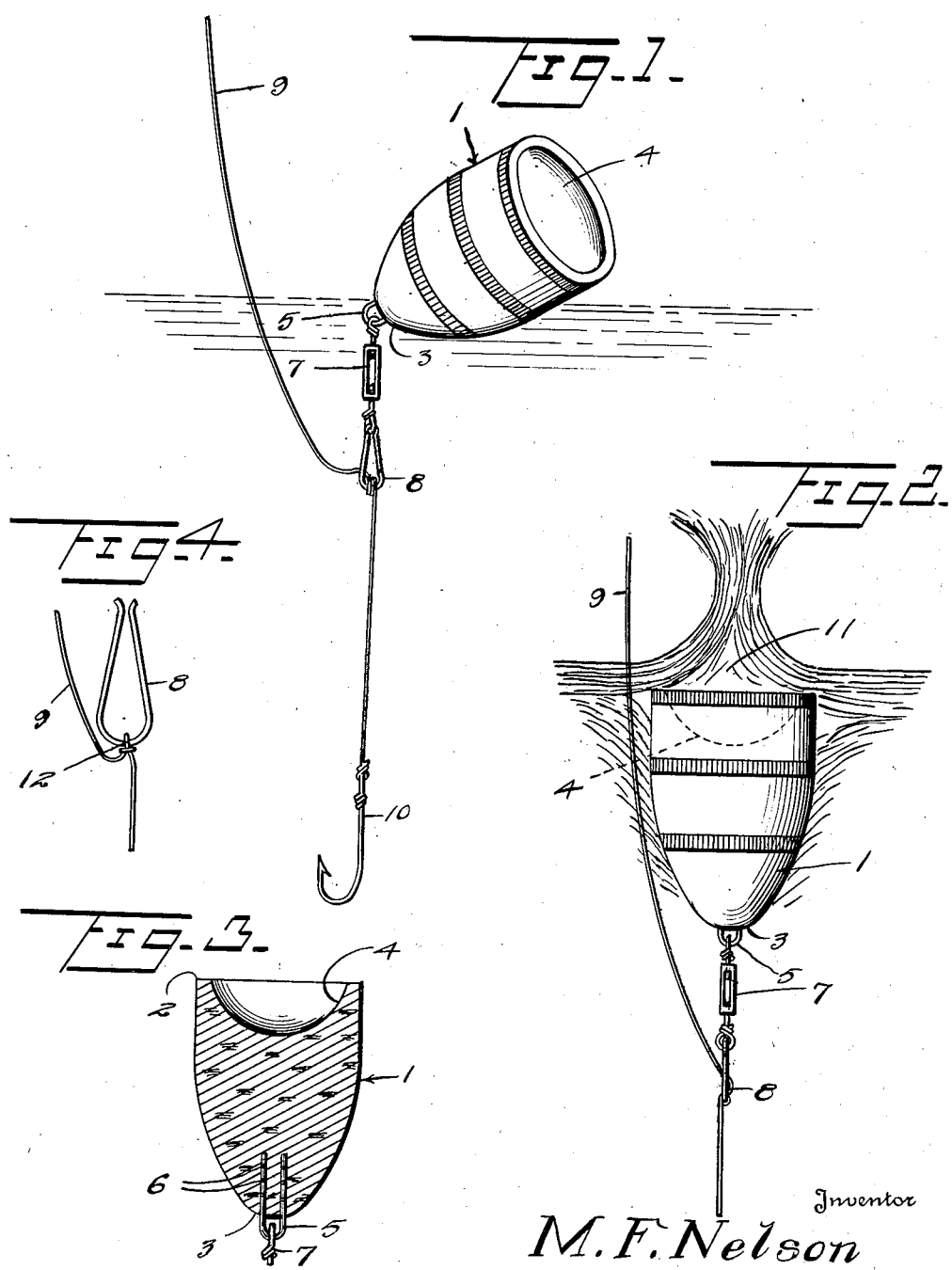
Inventor
M. F. Nelson
By Watson E. Coleman
Attorney Patented Dec. 21, 1937

2,103,222

UNITED STATES PATENT OFFICE 2,103,222

FISHING FLOAT

Moses F. Nelson, Highland Falls, N. Y.

Application April 14, 1936, Serial No. 74,380

2 Claims. (Cl. 43—49)

This invention relates to improvements in fishing tackle and pertains to an improved fish line float.

The primary object of the present invention is to provide an improved float which is so designed that when it is drawn beneath the surface of the water on which it is supported, when a fish has taken a hold upon the hook depending therefrom, it will cause a distinct sound to be made as it is drawn under so as to attract the attention of the fisherman.

Another object of the invention is to provide a novel float having a novel means of attaching a line holder thereto.

A still further object of the invention is to provide a line float having a design which will affect its movement in the water in a desired manner so as to assure the development of the distinctive sound which indicates that the float has been submerged and that a fish has probably taken the bait.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a perspective view of the float embodying the present invention showing the position assumed on the water.

Figure 2 is a view illustrating the action of the float when submerged.

Figure 3 is a vertical sectional view through the float.

Figure 4 is a view illustrating another method of attaching the fishing line to the snap.

Referring now more particularly to the drawing, wherein like numerals of reference designate corresponding parts throughout the several views, the numeral 1 indicates generally the float designed according to the present invention and the same may be made of any suitable buoyant material but is preferably formed of cork. As illustrated, the float is of cylindrical cross section throughout and one end, which is indicated by the numeral 2, is cut square across, while the other end tapers off to a rounded end or nose 3 which constitutes the bottom end of the float.

In the upper or square end 2, there is formed the depression or pocket 4 and the opposite end has fixed therein a staple 5 which is preferably in the form of a U-shaped metal body having transverse serrations 6 in each of its legs and having these serrated legs forced longitudinally into the cork body in the manner illustrated. These serrations 6 serve to retain the ends of the staple 5 in the body and, in addition, they may be coated with glue or any other suitable cementing substance before being inserted so as to further assure their retention.

Attached to the staple 5 is a swivel 7, carrying a spring snap 8.

When the float is put into use, the fishing line, which is indicated by the numeral 9, is threaded into the steel snap by pressing the spring of the snap to admit the line, then the line is wound around the shank or body of the snap two or three times or the line may be fastened to the snap with a slip or other type of knot, although the use of a knot is not really necessary. To change the position of the float while on the line, it is simply necessary to unwind the line and slide the float up or down the line to the depth required and then rewind or fasten the line with a slip knot, as previously described. To release the line from the float, the spring of the snap is pressed inwardly and the snap is slipped off the line. The float when once threaded on the line in the manner described cannot come off, but it may be readily shifted on the line in the manner described so as to vary the distance between the float and the hook.

When the cork or float is resting upon the water, it will assume the approximate position illustrated in Figure 1, the nose or lower end 3 being below the surface in the manner illustrated. When a fish takes the hook 10 and exerts a pull upon the line, the cork will be rapidly drawn downwardly beneath the surface, as illustrated in Figure 2, so that the square upper end will have the effect of creating an air space 11 above it and in the water as the cork goes down which, when it collapses and fills with water over the top end of the cork, will cause a distinct sound which will serve to attract the fisherman's attention to the fact that a fish has taken the bait.

While a sound can be produced by making the cork body with the square top end but without the depression or recess 4, the provision of this recess results in the development of a louder and more distinct sound, so that this construction is preferable, although the unrecessed end form will operate in substantially the same manner.

By the use of the staple illustrated, for connecting the swivel with the float, the float is permitted to ride the water freely and as it rocks, revolves, dives and travels on the surface of the water it will constantly jerk and tow the bait and, therefore, act as an effective means for attracting the fish. The swivel connection between the portion of the device to which the line is attached and the bait allows this free movement of the bait without twisting or in any way tangling the line.

From the foregoing, it will be apparent that the present invention may be easily and economically produced and will constitute a decided asset to a fisherman as it will serve to instantly attract his attention to a condition which might under certain conditions be overlooked and might result in the loss of a fish, particularly when fishing for those fish which require that the hook be quickly set in order to prevent the fishes escape.

While Figure 1 illustrates the line 9 as being wound or wrapped about the shank of the snap 8, the line may be tied with a slip knot, if preferred, as illustrated in Figure 4, where this knot is indicated by the numeral 12.

The float body may be made of any suitable material but it is preferred that it be made of cork and it will be obvious that the float may be painted in attractive colors as floats of this character usually are.

I claim:—

1. A float for use in still fishing, comprising an elongated body of buoyant material which is cut square across at one end and tapers to a blunt point at the opposite end, means secured in said point facilitating the attachment of a fishing line thereto, and means formed in the material of the body at the first mentioned end for producing a momentary water-free area thereover as the float is drawn downwardly beneath the water surface whereby the entrance of the water into said area will develop a signaling sound.

2. A float for use in still fishing, comprising an elongated body of buoyant material which is circular in cross-section and cut square across at one end and tapered to a blunt point at the opposite end, means at said pointed end facilitating the attachment of a combined control fishing line and bait-carrying line thereto, and a recess formed in the face of the first mentioned end for producing a momentary water-free area thereover as the float is drawn down beneath the surface of the water by the application of a downward pull to the bait-carrying portion of the line.

MOSES F. NELSON.